(12) United States Patent
Joy et al.

(10) Patent No.: US 7,694,923 B2
(45) Date of Patent: *Apr. 13, 2010

(54) UNIVERSAL MOUNTING ASSEMBLY FOR AN OBJECT AND METHOD

(76) Inventors: Gregory T. Joy, 955 Stow La., Lafayette, CA (US) 94549; Joh M. Congdon, 3020 198th Ave. SE., Sammamish, WA (US) 98075

(*) Notice: Subject to any disclaimer, the term of this patent is extended or adjusted under 35 U.S.C. 154(b) by 142 days.

This patent is subject to a terminal disclaimer.

(21) Appl. No.: 11/931,970

(22) Filed: Oct. 31, 2007

(65) Prior Publication Data
US 2008/0054131 A1 Mar. 6, 2008

Related U.S. Application Data (62) Division of application No. 11/046,425, filed on Jan. 27, 2005, now Pat. No. 7,290,740.

(60) Provisional application No. 60/539,674, filed on Jan. 27, 2004, provisional application No. 60/562,601, filed on Apr. 14, 2004.

(51) Int. Cl.
  *F16M 11/04* (2006.01)
(52) U.S. Cl. ............ 248/187.1; 248/177.1; 248/222.11
(58) Field of Classification Search .............. 248/177.1, 248/166, 168, 169, 170, 171, 187.1, 181.1, 248/181.2, 220.21, 225.11, 222.11, 140, 248/142, 223.41, 224.51, 224.61; 354/293; 403/299; 396/419, 424, 425, 428
See application file for complete search history.

(56) References Cited

U.S. PATENT DOCUMENTS

| | | | | |
|---|---|---|---|---|
| 3,737,130 A | * | 6/1973 | Shiraishi | 248/181.1 |
| 4,316,592 A | * | 2/1982 | Jett | 248/187.1 |
| 4,439,032 A | * | 3/1984 | Congdon | 396/419 |
| 4,525,052 A | * | 6/1985 | Kosugi et al. | 396/419 |
| 4,763,151 A | * | 8/1988 | Klinger | 396/419 |
| 5,069,407 A | * | 12/1991 | Williams | 248/222.11 |
| 5,452,874 A | * | 9/1995 | Kozloff et al. | 248/222.11 |
| 5,655,736 A | * | 8/1997 | Kozloff et al. | 248/179.1 |

(Continued)

OTHER PUBLICATIONS

*Ultra Pod Digital, Unique Mounting Solutions for Your Digital Camera*, Pedco, Redmond, Washington.

(Continued)

*Primary Examiner*—J. Allen Shriver
*Assistant Examiner*—Todd M. Epps
(74) *Attorney, Agent, or Firm*—Dean A Craine (57) ABSTRACT

A universal mounting assembly for quick mounting of an object to a stand device. The mounting assembly includes a body having a support surface, a front face and an opposed mounting surface configured to mount to the support stand. The front face intersects the support surface and defines an opening into a receiving socket of the body. An elongated slot extends along and into the receiving socket from the support surface, and includes a transverse width dimension smaller than that of the receiving socket. The receiving socket receives the transverse width dimension of the head portion therein as the neck portion simultaneously slides along the elongated slot to a dock position. A resilient retaining arm includes a contact portion movable between a released position and a locked position. A manually operable locking wedge prevents movement of the retaining arm from the locked position toward the released position.

16 Claims, 6 Drawing Sheets

U.S. PATENT DOCUMENTS

| | | | | |
|---|---|---|---|---|
| 5,931,440 | A | * | 8/1999 | Miller .................. 248/549 |
| 6,082,688 | A | * | 7/2000 | Wilson .................. 248/222.11 |
| 6,196,504 | B1 | * | 3/2001 | Lemke .................. 248/187.1 |
| 7,290,740 | B2 | * | 11/2007 | Joy et al. .................. 248/187.1 |
| 2003/0102341 | A1 | | 6/2003 | Iitsuka |
| 2003/0162510 | A1 | | 8/2003 | Kim |

OTHER PUBLICATIONS

PCT/US2005/002618 PCT Search Report and Written Opinion mailed May 24, 2005.

US Office Action (Nov. 14, 2006) from U.S. Appl. No. 11/046,425.

US Notice of Allowance (Jun. 22, 2007) from U.S. Appl. No. 11/046,425.

* cited by examiner

UNIVERSAL MOUNTING ASSEMBLY FOR AN OBJECT AND METHOD

RELATED APPLICATION DATA

This application is a divisional application of Ser. No. 11/046,425, now U.S. Pat. No. 7,290,740, filed Jan. 27, 2005, naming Greg Joy and Jon Congdon as the inventors, entitled PORTABLE TRIPOD AND UNIVERSAL MOUNTING ASSEMBLY FOR AN OBJECT, which in turn claims priority under 35 U.S.C. §119 to U.S. Provisional Application Ser. No. 60/539,674, naming Greg Joy as the inventor, filed Jan. 27, 2004, and entitled PORTABLE STAND FOR CAMERA PHONES; and to U.S. Provisional Application Ser. No. 60/562,601, naming Greg Joy as the inventor, filed Apr. 14, 2004, and entitled PORTABLE TRIPOD AND ATTACHMENT DEVICE FOR CAMERAS EMBEDDED IN CELLULAR PHONES, the entirety of which are incorporated herein by reference in its entirety for all purposes.

TECHNICAL FIELD

The present invention relates to universal mounting devices, and more particularity, relates to portable tripods and universal mounting devices for objects.

BACKGROUND ART

In the recent past digital photography has experienced explosive growth. In 2003, for instance, world wide conventional digital camera sales surpassed 35 mm film based camera sales for the first time. Also, in 2003, cellular phone sales that incorporate digital cameras (i.e., camera phones) surpassed digital camera sales.

It is estimated by InfoTrends that camera phone shipments to North America alone in 2005 will be just over nine million. The number is estimated to increase to 25 million in 2006 and another research firm, IDC, forecasts 84 million camera phones by 2007. Moreover, according to Fuji Photo Film U.S.A., Inc. there are 130 million cell phones in the US, while only 4% are camera phones. In Japan, by comparison, that percentage is 80%, and it is anticipated that the United States will experience similar growth numbers as well.

As camera phones and, even more recently, video phones become more technologically advanced and their use as a viable digital photography and video alternative increases, a means for "hands free" operation is more desirable. Accordingly, there is an increasing need to provide a quick mount universal platform to hold and support the camera phone and/or video phone for photography and/or video applications.

DISCLOSURE OF INVENTION

The present invention provides a universal mounting assembly for a support stand device to removably mount an object to the stand device. The object contains a universal button device including a neck portion and a head portion. The head portion of the button device has a transverse width dimension greater than that of the neck portion. A proximal end of the button device neck portion is for coupling to the object, while a distal end thereof is mounted to the head portion.

The mounting assembly of the present invention includes a body having a support surface, a front face and an opposed mounting surface configured to mount to the support stand. The front face intersects the support surface and defining an opening into a receiving socket of the body. The body further defines an elongated slot extending along and into the receiving socket from the support surface. The elongated slot has a transverse width dimension smaller than that of the receiving socket, but suitable to receive a transverse width dimension of the button device neck portion. The receiving socket is formed and dimensioned for sliding receipt of the transverse width dimension of the head portion therein as the neck portion simultaneously slides along the elongated slot to a dock position. The mounting assembly further includes a resilient retaining arm cantilever disposed in the receiving socket. The retaining arm includes a contact portion movable between a released position and a locked position, locking the head portion to the body when at the dock position in the receiving socket. A manually operable locking wedge moves between an unengaged condition, enabling movement in the retaining arm toward the released position, and an engaged condition, preventing movement of the retaining arm from the locked position toward the released position.

Accordingly, any camera phone or other object can be quickly snapped secure to virtually any stand device. A locking assembly is then engaged to tightly secure the camera phone in place for photographic operation thereof.

In one specific embodiment, the resilient retaining arm is cantilever mounted to the body in a manner biasing the contact portion toward the locked position. The contact portion includes a retaining nipple upstanding therefrom that is formed for retaining receipt in a hollow in the bottom side of the head portion when the retaining arm is in the locked position. The retaining nipple includes a ramped portion facing the opening into the receiving socket. This ramped portion is formed to facilitate sliding movement of the nipple into the button hollow during sliding movement of the head portion toward the docked position.

In yet another specific embodiment, the locking wedge is configured to engage a bottom side of the retaining arm to prevent movement thereof from the locked position to the released position. The locking wedge includes a threaded post and a thumb nut threadably mounted to the post for axial movement therealong between the engaged and unengaged conditions. The threaded post is mounted to the body such that a distal end thereof extends in a direction toward the bottom side of the retaining arm.

In still another configuration, a spring clip resiliently supports the retaining arm between the engaged and non-engaged conditions. The side walls define opposed guide rails that are formed and dimensioned for sliding receipt of the edges of the spring clip through the opening into the receiving socket. The spring clip is then mounted to the opposed interior side walls of the body that define portions of the receiving socket.

In another aspect of the present invention, a portable stand assembly is provided for removably securing a camera phone thereto. The stand assembly includes a portable stand device, and a camera mount device mounted to the portable stand device in a manner enabling articulation of the mount device, the mount device including a body defining an opening into a receiving socket of the body. The body further includes an elongated slot extending along and into the receiving socket from a support surface. The elongated slot has a transverse width dimension smaller than that of the receiving socket, but suitable to receive a transverse width dimension of the neck portion of the mounting button. The receiving socket is formed and dimensioned for sliding receipt of the transverse width dimension of the button head portion as the neck portion slides along the elongated slot to a dock position. A lock assembly selectively retains and locks the mounting button to the mount device in the dock position.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Referring now generally to FIGS. 1A-2 and 10A-10D, a portable stand assembly, generally designated 20, is provided for removably securing a camera phone 21 or object thereto. The camera phone 21 includes a universal mounting button 22 having neck portion 23, a mounting platform 24 and a head portion 25 for mounting to the stand assembly 20. The head portion 25 of the mounting button 22 has a transverse width dimension greater than that of the button neck portion 23. The button neck portion includes a proximal end for coupling (via the mounting platform 24) to the camera phone 21 (e.g., through adhesive, cradle, case, etc.) and a distal end thereof mounted to the button head portion 25. The stand assembly of the present invention includes a portable stand device, generally designated 26, and a universal mounting assembly, generally designated 27, for removably securing the camera phone or object to the portable stand device 26, via the mounting button 22, in a manner enabling articulation of the mounted camera phone 21. The present invention, therefore, provides portable stand devices adapted to quick mount and support a camera phone or object so that still photographs can be taken without holding the camera phone.

Figure 3:
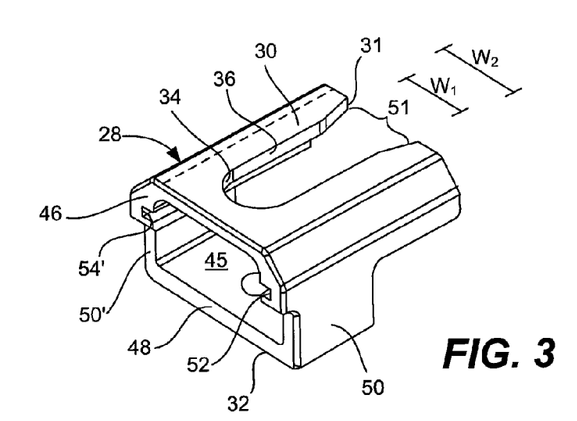
FIG. 3 is a reduced top perspective view of a body member of the mounting assembly of FIG. 1A.
Figure 4:
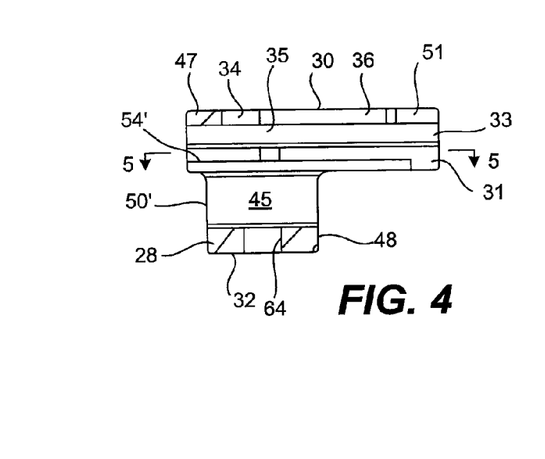
FIG. 4 is a cross-sectional, side elevation view of the body member of FIG. 3.
Figure 10A:
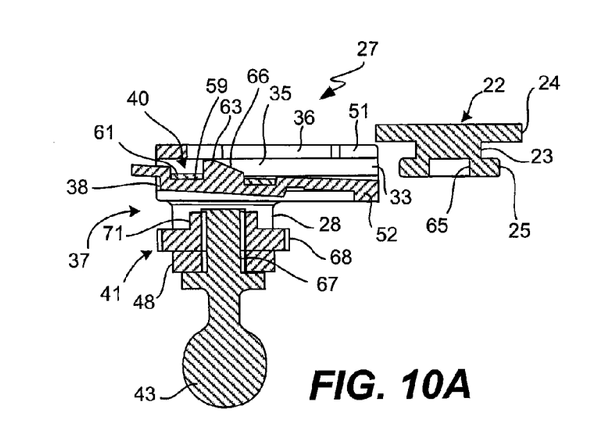
FIG. 10A-10D is a sequence of side elevation views, in cross-section, of the mounting assembly of FIG. 2, illustrating mounting of a mounting button and operation of the locking assembly.
Figure 10B:
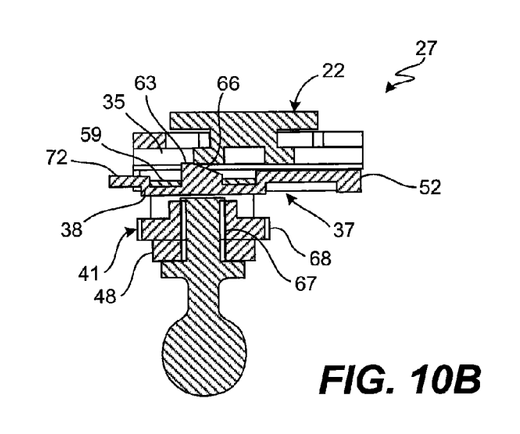
Figure 10C:
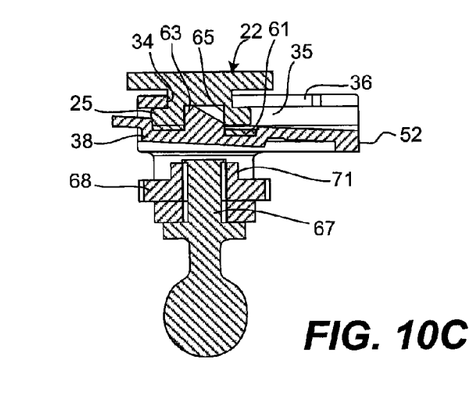

The universal mounting assembly 27 includes a body 28 having a support surface 30, a front face 31 and an opposed mounting surface 32, configured to mount to the support stand device 26. The body 28 further defines a socket opening 33, on the front face 31 into a receiving socket 35 thereof, and further includes an elongated slot 36 extending adjacent and into the receiving socket 35 from the upper support surface 30. As best viewed in FIG. 3, the elongated slot 36 includes a transverse width dimension $W_1$ smaller than the transverse width dimension $W_2$ of the receiving socket 35. The transverse width dimension $W_1$ of the elongated slot 36 is formed and dimensioned for sliding receipt of a transverse width dimension of the button neck portion, while the transverse width dimension $W_2$ of the receiving socket 35 is formed and dimensioned for sliding receipt of the transverse width dimension of the head portion 25. During mounting engagement, thus, the neck portion 23 and the head portion 25 simultaneously slide along the elongated slot 36 and the receiving socket 35, respectively, to an end dock portion 34 (FIGS. 1B, 3 and 10C).

Briefly, it will be appreciated that the present invention is adapted to accommodate a variety of different diameter mounting buttons, as well as those having head portions and neck portions of varying dimensions. It is imperative, however, that the transverse width of the button head portion 25 is not less than the transverse width dimension $W_1$ of the elongated slot 36. This arrangement, of course, which enable the head portion 25 of the mounting button 22 to pass through the elongated slot 36.

In accordance with the present invention, the universal mounting assembly 27 preferably includes a lock assembly, generally designated 37, to selectively retain and lock the mounting button 22 to the body 28 in the dock position. The lock assembly 37, as best illustrated in FIGS. 2 and 10A-10D, includes a resilient retaining arm 38 cantilever disposed in the receiving socket 35. A contact portion 40 of the retaining arm is movable between a released position (FIG. 10B) and a locked position (FIG. 10C). In the locked position, the button head portion 25 is secured and locked to the body 28 when at the dock position in the receiving socket 35. The lock assembly 37 further includes a locking wedge 41 manually operable between an unengaged condition (FIG. 10C), enabling movement in the retaining arm 38 toward the released position, and an engaged condition (FIG. 10D), preventing movement of the retaining arm from the locked position toward the released position.

Accordingly, any camera phone 21 or other object, capable of having a universal mounting button 22 or the like mounted or coupled to the phone or object may then be quickly secured and mounted to the stand device 26 through the mounting assembly 27 of the present invention. As will be described, the mounting assembly is configured to receive and accommodate varying diameter and height mounting buttons so as to provide a universal mount. Moreover, the universal mounting assembly of the present invention can be affixed to virtually any stand device 26, fixed or portable that is capable of providing a stable base. Preferably, however, the mounting assembly is particularly suitable to affix to foldable tripod units that incorporate mounting hardware geared toward the mounting of ball joints. By way of example, one particular portable tripod is that disclosed in U.S. Pat. No. 4,439,032 to Congdon, entitled PORTABLE CAMERA SUPPORT, and incorporated herein by reference in its entirety.

Figure 1A:
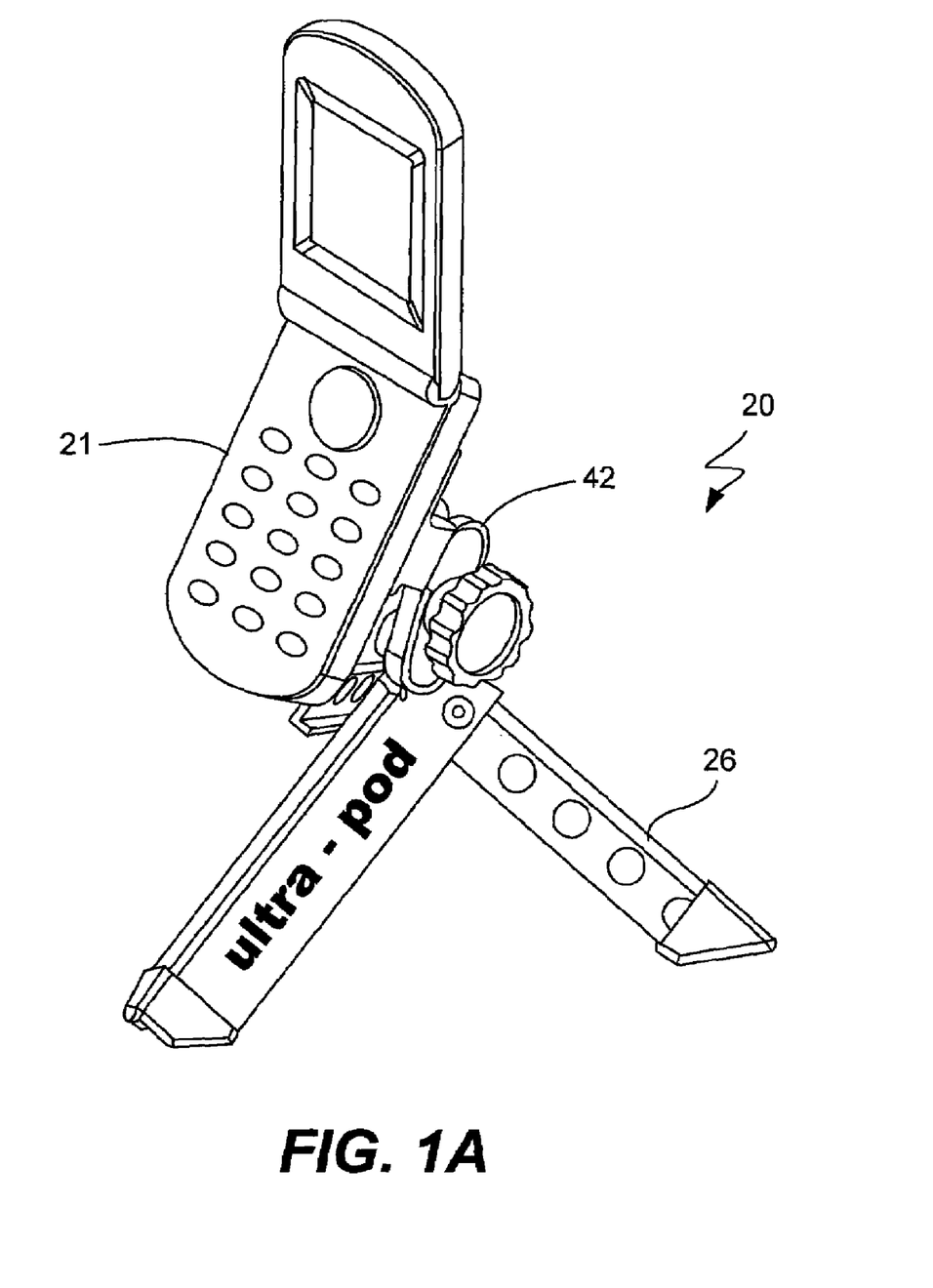
FIG. 1A is a top perspective view of a portable stand assembly supporting a camera phone through a mounting assembly constructed in accordance with the present invention.
Figure 1B:
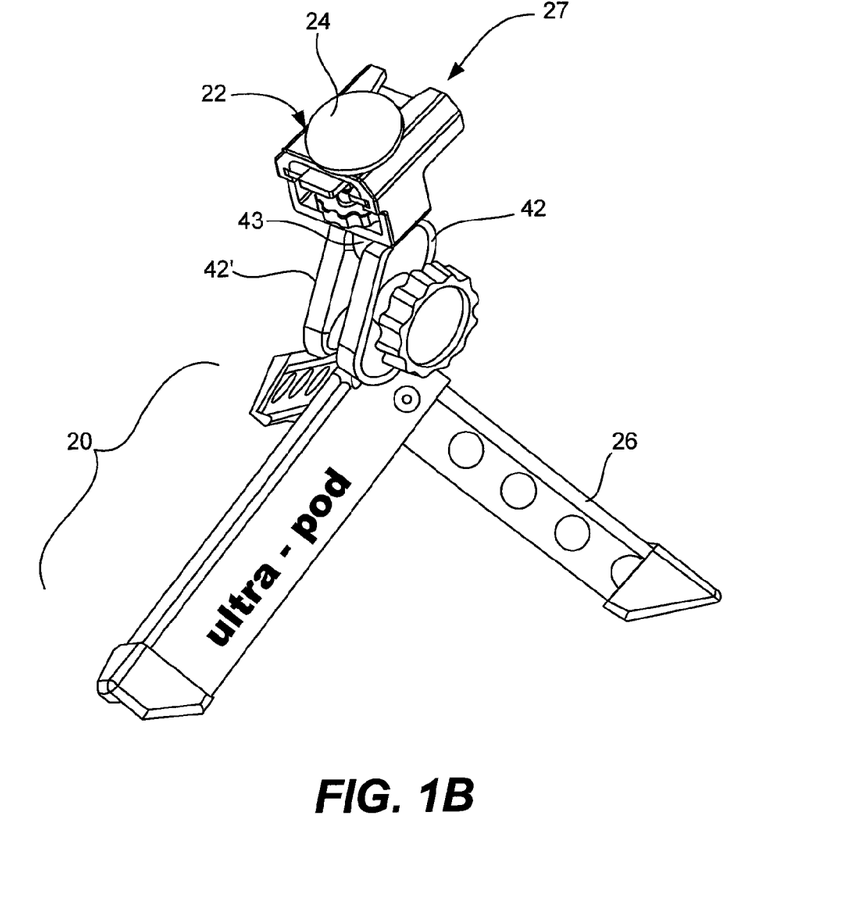
FIG. 1B is a top perspective view of the portable stand assembly of FIG. 1A illustrating the engagement of a mounting button with the mounting assembly.

This particular stand 26, as shown in FIGS. 1A and 1B, is very portable, and incorporates a pair of socket jaw plates 42, 42' that engage and grip a universal ball joint 43 to enable articulation of the camera unit mounted thereto. Through operation of a turn screw, the jaw plates 42, 42' clamped down onto ball joint 43 for securing thereof in a selected position. It will be appreciated that while one particular stand device is shown and described, any stand device may be employed upon which the mounting assembly 27 of the present invention may mount to.

Similarly, the present invention preferably cooperates with a universal mounting button. These buttons are typically incorporated on cell phone cradles or cell phone cases which enable quick mount of the case or cradle (holding the cell phone 21) to a clip or the like. These quick clips, while securing the cell phones, are not suitable to provide a fixed base for the cell phone, and can be easily rotated and/or ratted while in the clip.

Turning now to FIGS. 2-5, the universal mounting assembly of the present invention is now described in detail. In one embodiment, the body 28 is a generally rectangular or L-shaped shell structure defining a central cavity 45 extending from the front face 31 to an opposite rear face 46 thereof. The upper support surface 30 is preferably generally planar and part of an upper support wall 47, while the lower mounting surface 32 is also preferably generally planar and part of a lower support wall 48. A pair of L-shaped side walls 50, 50' intersects and couples the upper support wall 47 to the lower support wall. Collectively, these walls define the central cavity 45, an upper portion of which defines the head receiving socket 35.

As mentioned, the upper support wall 47 defines the elongated slot 36 that extends into and adjacent the receiving socket 35, and extends longitudinally along the upper support wall 47. Front access to the elongated slot 36, as well as the receiving socket 35, is through the socket opening 33 at the front face 31 of the body 28. In one specific embodiment, a front mouth portion 51 of the elongated slot 36 has a transverse width dimension slightly larger than the width dimension $W_1$ of the remaining portion thereof. This mouth portion 51 tapers gradually inwardly to facilitate receipt of the button neck portion 23, funneling it toward the dock position (FIGS. 2 and 3) at the end of the elongated slot 36.

Figure 7:
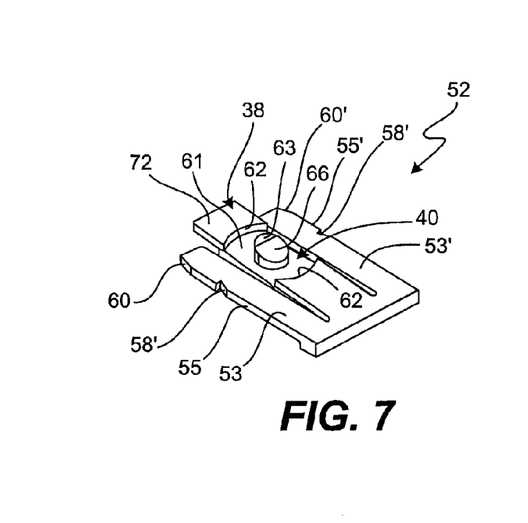
FIG. 7 is an enlarged top perspective view of a spring clip of the mounting assembly of FIG. 1A.
Figure 8:
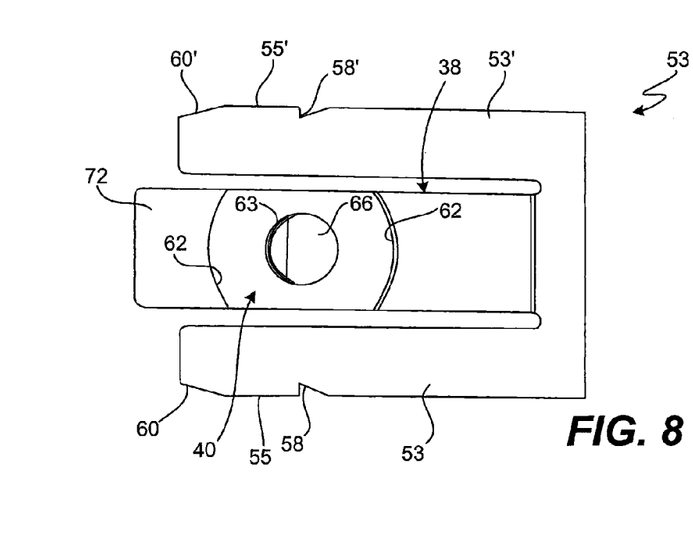
FIG. 8 is an enlarged top plan view of the spring clip of FIG. 7.
Figure 9:
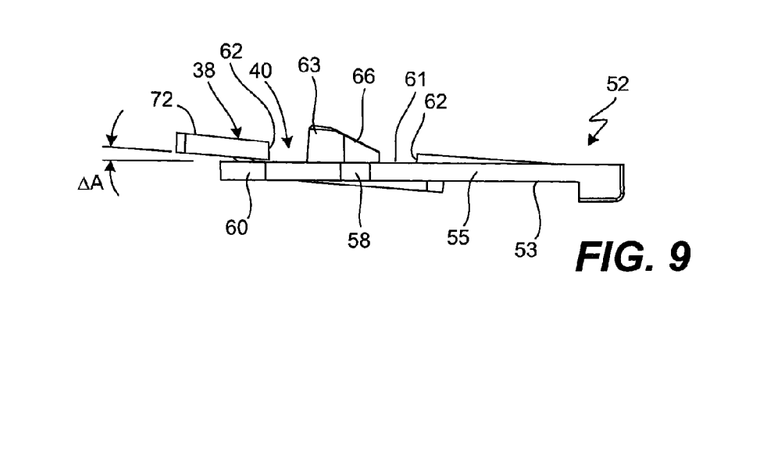
FIG. 9 is an enlarged side elevation view of the spring clip of FIG. 7.

In accordance with the one aspect of the present invention, a spring clip 52 (FIGS. 7-9) resiliently supports the retaining arm 38 between the locked position and the released position. The spring clip 52 is substantially planar, having a pair of clip legs 53, 53' extending adjacent to and in the same direction as the retaining arm 38. The retaining arm 38 and the clip legs 53, 53' are integrated or mounted to a proximal end portion of the spring clip 52, enabling the retaining arm 38 to be cantilever mounted. The thickness of the spring clip at this proximal portion is increased slightly, relative the leg thicknesses to reinforce and strengthen the spring clip for additional resiliency. Further, as shown in FIG. 9, the retaining arm 38 is angled slightly upward from the horizontal plane containing the clip legs to further facilitate bias of the resilient retaining arm 38 toward the locked position (FIG. 10C). This offset angle ΔA is preferably in the range of about 1° to about 8°, and more preferably about 4° from the horizontal plane of the clip legs.

To assure sufficient resiliency, the spring clip 52 (as well as the body 28) may be composed and an injection molded material such as plastic. It will be appreciated, however, that other resilient materials may be employed such as a metallic material or other materials with resilient or spring-like properties.

The opposed interior surfaces of the side walls 50, 50' define a pair of opposed guide rails 54, 54' that extend longitudinally along central cavity 45. These guide rails are formed and dimensioned for sliding receipt of the respective edges 55, 55' of the respective clip legs 53, 53' therein, and provide a means for mounting the spring clip 52 to the body 28. Through the socket opening 33, the opposed guide rails 54, 54' can be accessed for mounting of the spring clip 52. By aligning the opposed edges 55, 55' of the spring clip 52 with the corresponding guide rails 54, 54 of the body, the spring clip can be slid along the guide rails until the contact portion 40 of the retaining arm 38 is positioned generally vertically below the end dock portion 34 of the elongated slot 36. Accordingly, by supporting the opposed edges 55, 55' of the clip legs 53, 53' in the corresponding guide rails 54, 54', the retaining arm 38 is caused to be cantilever mounted in the receiving socket 35. Moreover, when the spring clip 52 is positioned in the central cavity, it forms the bottom floor of the receiving socket 35 of the body.

Figure 5:
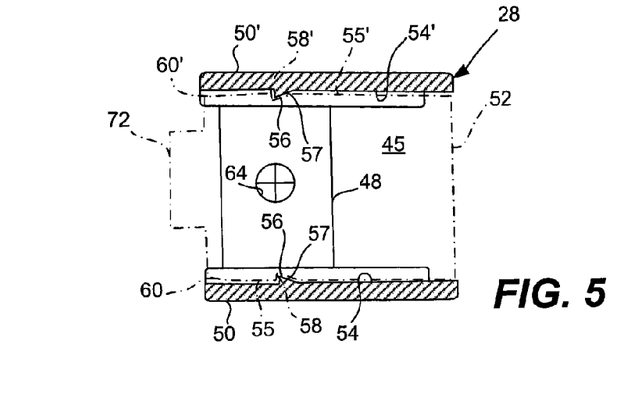
FIG. 5 is a cross-sectional, top plan view of the body member taken along the plane of the line 5-5 in FIG. 4.

To retain the spring clip 52 in the guide rails 54, 54', each slot includes a detent 56, 56' preceded by a ramped portion 57, 57' (FIG. 5 where clip 52 is illustrated in phantom lines). These detents functions to retain the spring clip in place during operation of the retaining arm. FIG. 8 best shows that each leg edge 55, 55', correspondingly, also includes an associated notch 58, 58' that is formed for receipt of the corresponding detent 56, 56' therein. Accordingly, as the opposed edges 55, 55' of the clip legs 53, 53' engage the guide rails 54, 54' a distal chamfer 60, 60' of each leg slideably engages the corresponding ramped portion 57, 57' of the detent 56, 56'. Since the clip legs 53, 53' are also cantilever mounted to the proximal end portion of the spring clip 52, the ramped portions cause the legs to displace inwardly toward one another in the horizontal plane of the legs. Once a distal corners, forming the notches 58, 58', are just past the detent 56, 56', the resilient legs spring back outwardly where the detents 56, 56' are received in the opposed notches 58, 58', retaining the spring clip in the central cavity 45. It will be appreciated, of course, that these retaining components can be easily reversed without departing from the true spirit and nature of the present invention.

Turning now to FIGS. 7, 9 and 10A-10D at the contact portion 40 of the retaining arm 38, a button recess 61 is provided that is formed and dimensioned for at least partial receipt of the head portion 25 therein when the mounting button is positioned at the dock portion 34 of the elongated slot 36, and the retaining arm 38 is moved to the locked position. At this region, a ledge portion 62 defines the button recess 61, which is illustrated as circular, but can be a variety of dimensions. It will be understood that this recess 61 is sized larger than the button head portion so that it may accommodate a variety of different diameter or shaped heads, similar to the transverse width dimension $W_2$ of the receiving socket 35.

Centrally upstanding from the contact portion 40 is a nipple 63 that is formed and dimensioned to insert into a hollow or hole 65 in the mounting button 22. When the mounting button 22 is oriented at the slot dock portion 34, and the retaining arm is oriented in the locked position, the upstanding nipple 63, together with the ledge portion 62 of the button recess 61, cooperate to retain the button at the dock portion 34 of the slot.

The nipple 63 includes a ramped portion 66 that is oriented to face the socket opening 33. This ramped portion 66 facilitates insertion of the nipple into the mounting button hole 65 during engagement with the head portion, the contact of which urges the retaining arm 38 in the downward direction toward the released position. Accordingly, during a mounting operation, as shown in the sequence of FIGS. 10A-10D, the head portion 25 of the mounting button 22 (which is mounted to the camera phone 21 or object as above-described) is positioned at the opening 33 of the receiving socket 35. As the mounting button 22 is moved and urged toward the docked position, the neck portion 23 is slideably received in the elongated slot 36 while the head portion 25 simultaneously slideably engages a topside of the retaining arm 38. Further sliding contact causes the cantilever mounted retaining arm to pivot downwardly toward the released position. As the mounting button 22 slides closer to the docked position at the contact portion 40, the head portion 25 contacts the ramped portion 66 of the nipple 63 (FIG. 10B), increasing the rate of downward displacement of the retaining arm toward the released position. Once the upstanding nipple 63 extends just beyond a ledge of the hole 65 of the head portion 25, while at the same time, the button head portion extends just beyond the ledge portion 62 of the contact portion 40, the resiliency of the spring clip urges and biases the retaining arm 38 toward the locked position, retaining the mounting button in the contact portion (FIG. 10C).

Figure 10D:
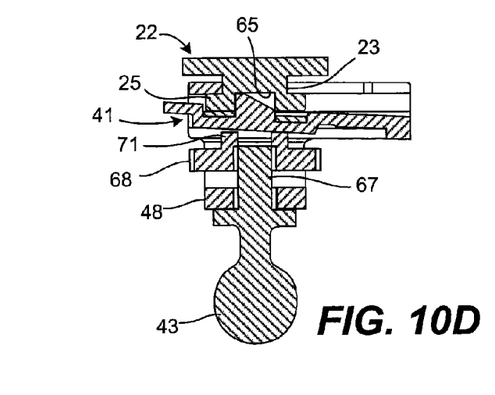

In one specific embodiment, the contact portion 40 includes a pad 59 or the like disposed at the bottom of the recess 61. This pad facilitates gripping of the button member when the retaining arm is moved to the locked position (FIGS. 10C and 10D). The pad 59 is composed of a gripping material such as rubber or cork.

As mentioned above, and in accordance with the present invention, the lock assembly 37 also includes a locking wedge 41 that is manually operable between an unengaged condition (FIG. 10C), enabling movement in the retaining arm 38 toward the released position, and an engaged condition (FIG. 10D), preventing movement of the retaining arm from the locked position toward the released position. That is, while the retaining arm 38 is resilient and biased toward the locked position, the retaining arm is still capable of being moved (intentionally or inadvertently) toward the released position in order to release the mounting button from the locked position. The locking wedge, hence, prevents inadvertent release of the mounting button.

FIGS. 10C and 10D best illustrate that the locking wedge 41 is configured to selectively engage a bottom side of the retaining arm 38, preferably proximate the arm contact portion 40, to prevent cantilever displacement thereof from the locked position to the released position. By sufficiently engaging the retaining arm bottom side (FIG. 10D), cantilever displacement of the retaining arm toward the released position (FIG. 10B) can be prevented altogether.

In one specific embodiment, the locking wedge 41 includes a threaded post 67 upstanding from the lower support wall 48 and into the central cavity 45. This post is preferably oriented to extend in a direction just under the retaining arm 38, proximate the contact portion region. Most preferably, this post may be part of the post that mounts the ball joint 43 to the body. In this configuration, the threaded post 67 extends through an aperture 64 in the lower support wall 48 (FIGS. 10A-10D), and provides the dual function of mounting the ball joint 43 to the body 28 and functioning as part of the lock assembly 37.

The locking wedge 41 further includes a quick release nut or Tee wheel 68 (FIG. 6) that is threadably mounted to the post 67 for axial movement therealong between the engaged condition (FIG. 10D) and the unengaged condition (FIG. 10C). As mentioned, in the engaged condition, the retaining arm 38 is prevented from being moved from the locked position, while in the unengaged condition, cantilever movement of the retaining arm toward the released position can commence.

Figure 6:
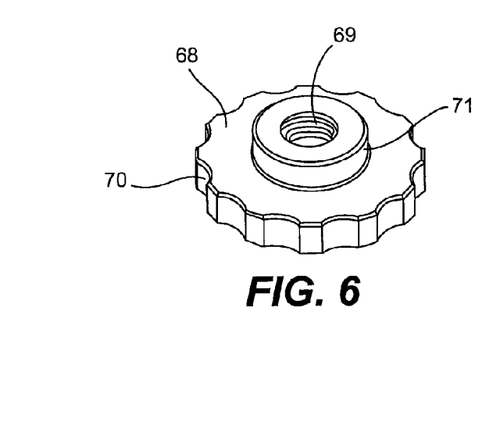
FIG. 6 is an enlarged top perspective view of a Tee wheel of a locking assembly for the mounting assembly of FIG. 1A.

The Tee wheel 68 is cylindrical shaped, and includes a serrated edge portion 70 to enhance gripping thereof. Upstanding from the wheel is a central neck portion 71 that includes a threaded passage 69 to enable threaded mounting to the threaded post 67. The Tee wheel, thus, can be selectively moved axially up and down along the post 67 by rotating the wheel clockwise or counter-clockwise. Accordingly, to lock the retaining arm in the locked condition when the mounting button 22 is oriented at the docking position, the Tee Wheel 68 is rotated about the threaded post 67 until a distal end of the central neck portion 71 abuts the bottom side of the retaining arm. Conventional hand-tightening of the Tee wheel 68 about the post 67 will secure the central neck portion 71 in abutting contact tightly against the bottom side.

Figure 2:
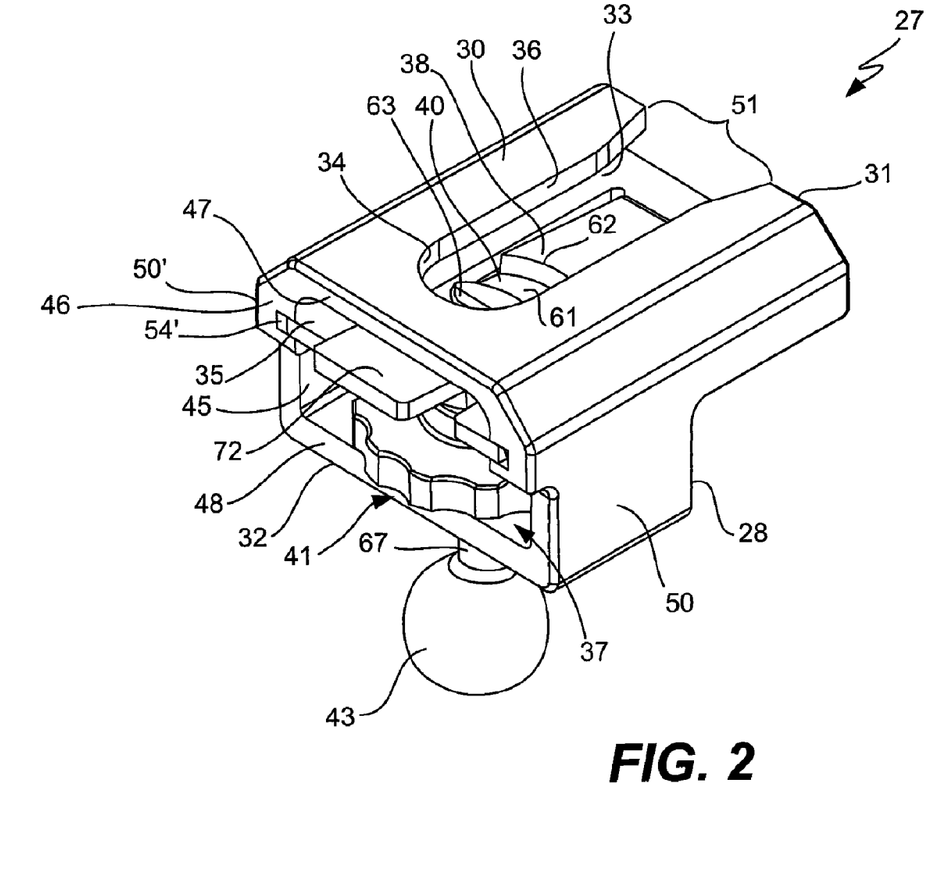
FIG. 2 is an enlarged top perspective view of the mounting assembly of FIG. 1A.

FIG. 2 best illustrates that the Tee wheel 68 is sized and oriented to extend beyond the rear face 46, and beyond a lower portion of the front face of the body. This enables easy access to rotate the Tee wheel 68 between the engaged and unengaged conditions. Moreover, while the locking wedge 41 has been described in one particular configuration, it will be appreciated that other designs can be incorporated that engages the retaining arm 38, and prevents it from moving toward the released position.

To operate the retaining arms, a distal latch portion 72 is integrally included that also extends past the rear face 46 of the body. This distal latch portion 72 enables manual actuation of the retaining arm 38 toward the released position, when the locking wedge 41 is in the unengaged condition. Hence, to remove the mounting button 22 from the locked docked position, the operator rotates the Tee wheel 68 (generally counter-clockwise) about the threaded post 67. Axially moving the Tee wheel 68 along the threaded post 67 from the engaged condition to the unengaged condition allows the operator to actuate the latch portion 72, and thus the retaining arm, from the locked position to the released position. In the released position, the retaining nipple 63 of the contact portion 40 is cantilever displaced just out of button hole 65, while button head portion 25 is displaced beyond the ledge portion 62 of the button recess 61. This enables the operator to slide the mounting button toward and out of the opening 33 of the receiving socket 35.

One other function of the mounting post and/or Tee wheel is the function of an end stop for the retaining arm. By providing a stop device below the contact portion 40 of the retaining arm, an operator will be prevented from over-extending the displacement the latch portion 72, past its elastic limit, deforming or breaking the retaining arm.

Those skilled in art will appreciate that other possible modes can accomplish the essentially same tasks. Moreover, although only a few embodiments of the present inventions have been described in detail, it should be understood that the present inventions might be embodied in many other specific forms without departing from the spirit or scope of the inventions.

What is claimed is:

1. A universal mounting assembly for a support stand device to removably mount an object to the stand device, said object supporting a universal button device including a neck portion and a head portion, said head portion having a transverse width dimension greater than that of the neck portion to form a retaining shoulder portion at an interface therebetween, the button device neck portion having a proximal end for coupling to the object and a distal end thereof mounted to the head portion, said mounting assembly comprising: a body having an upper support surface and an opposed mount cooperatively mounted to the support stand device in a manner enabling articulation of the body, said body further including a front face and an opposed rear face, said front face defining an opening into a receiving socket of the body extending longitudinally along said body from said front face toward said rear face, said body further defining an elongated slot extending generally along and into said receiving socket from said upper support surface, said elongated slot having a transverse width dimension less than that of said receiving socket and that of the mounting button head portion, but suitable to slideably receive a transverse width dimension of the neck portion of the button device, and said receiving socket being formed and dimensioned for sliding receipt of the transverse width dimension of said head portion as said neck portion slides along the elongated slot to a dock position such that said shoulder portion of the button device prevents upward passage of the button device through the elongated slot; and a lock assembly selectively engaging the button device in a manner causing frictional contact of the shoulder portion against said body to retain and lock the mounting button device to the body in the dock position.

2. The universal mounting assembly according to claim 1, wherein said lock assembly includes: a resilient retaining arm cantilever disposed in said receiving socket, and having a contact portion movable between a released position and a locked position, locking said head portion to the body when at the dock position in the receiving socket; and a locking wedge manually operable between an unengaged condition, enabling movement in the retaining arm toward the released position, and an engaged condition, preventing movement of said retaining arm from the locked position toward the released position.

3. The universal mounting assembly according to claim 2, wherein said resilient retaining arm is cantilever mounted to said body in a manner biasing the contact portion toward the locked position.

4. The universal mounting assembly according to claim 3, wherein said contact portion includes a retaining nipple upstanding therefrom, and formed for retaining receipt in a hollow in the bottom side of the head portion when the retaining arm is in the locked position.

5. The universal mounting assembly according to claim 4, wherein said retaining nipple includes a ramped portion facing the opening into said receiving socket, and formed to facilitate sliding movement of the nipple into the button hollow during sliding movement of the head portion toward the docked position.

6. The universal mounting assembly according to claim 4, wherein said locking wedge is configured to engage a bottom side of the retaining arm to prevent movement thereof from the locked position to the released position.

7. The universal mounting assembly according to claim 6, wherein said locking wedge includes a threaded post and a thumb nut threadably mounted to the post for axial movement therealong between the engaged and unengaged conditions.

8. The universal mounting assembly according to claim 7, wherein said threaded post being mounted to said body such that a distal end thereof extends in a direction toward the bottom side of the retaining arm.

9. The universal mounting assembly according to claim 8, wherein a proximal end of the threaded post extends proximally from said opposed mounting surface of the body, and includes a ball joint member formed and dimensioned for mounting engagement to the support stand.

10. A universal mounting assembly for a support stand device to removably mount an object to the stand device, said object supporting a universal button device including a neck portion and a head portion, said head portion having a transverse width dimension greater than that of the neck portion, the button device neck portion having a proximal end for coupling to the object and a distal end thereof mounted to the head portion, said mounting assembly comprising: a body having an upper support surface, an opposed mounting surface configured to mount to said support stand and a front face, said front face intersecting said support surface and defining an opening into a receiving socket of the body, said body further defining an elongated slot extending along and into said receiving socket from said support surface, said elongated slot having a transverse width dimension less than that of said receiving socket, but suitable to receive a transverse width dimension of the button device neck portion, and said receiving socket being formed and dimensioned for sliding receipt of the transverse width dimension of said head portion as said neck portion slides along the elongated slot to a dock position; a resilient retaining arm cantilever disposed in said receiving socket, and having a contact portion movable between a released position and a locked position, locking said head portion to the body when at the dock position in the receiving socket; and a locking wedge manually operable between an unengaged condition, enabling movement in the retaining arm toward the released position, and an engaged condition, preventing movement of said retaining arm from the locked position toward the released position.

11. The universal mounting assembly according to claim 10, wherein said resilient retaining arm is cantilever mounted to said body in a manner biasing the contact portion toward the locked position.

12. The universal mounting assembly according to claim 11, wherein said contact portion includes a retaining nipple upstanding therefrom, and formed for retaining receipt in a hollow in the bottom side of the head portion when the retaining arm is in the locked position.

13. The universal mounting assembly according to claim 12, wherein said retaining nipple includes a ramped portion facing the opening into said receiving socket, and formed to facilitate sliding movement of the nipple into the button hollow during sliding movement of the head portion toward the docked position.

14. The universal mounting assembly according to claim 12, wherein said locking wedge is configured to engage a bottom side of the retaining arm to prevent movement thereof from the locked position to the released position.

15. The universal mounting assembly according to claim 11, further including: a spring clip resiliently supporting of said retaining arm between the engaged and non-engaged conditions, and mounted to opposed interior side walls of the body that define portions of said receiving socket.

16. The universal mounting assembly according to claim 15, further including: said side walls define opposed guide rails formed and dimensioned for sliding receipt of the edges of said spring clip through said opening into the receiving socket.

* * * * *